(12) United States Patent
Bye (10) Patent No.: US 11,375,409 B2
(45) Date of Patent: Jun. 28, 2022

(54) CELLULAR NETWORK CAPACITY SLICING SYSTEMS AND METHODS

(71) Applicant: DISH Wireless L.L.C., Englewood, CO (US)

(72) Inventor: Stephen Bye, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 84 days.

(21) Appl. No.: 16/844,337

(22) Filed: Apr. 9, 2020

(65) Prior Publication Data

US 2021/0321301 A1 Oct. 14, 2021

(51) Int. Cl.
*H04W 28/24* (2009.01)
*H04L 41/5003* (2022.01)
*H04W 28/02* (2009.01)
*H04L 47/80* (2022.01)
*H04W 48/18* (2009.01)

(52) U.S. Cl.
CPC ......... *H04W 28/24* (2013.01); *H04L 41/5003* (2013.01); *H04L 47/14* (2013.01); *H04L 47/805* (2013.01); *H04W 28/0268* (2013.01); *H04W 48/18* (2013.01)

(58) Field of Classification Search
None
See application file for complete search history.

(56) References Cited

U.S. PATENT DOCUMENTS

| 9,467,843 | B1* | 10/2016 | Smith | H04W 16/14 |
| 2002/0152319 | A1* | 10/2002 | Amin | H04L 67/322 |
| | | | | 709/232 |
| 2008/0279139 | A1* | 11/2008 | Beziot | H04W 28/24 |
| | | | | 370/329 |

(Continued)

FOREIGN PATENT DOCUMENTS

| EP | 3 539 316 A1 | 9/2019 |
| WO | 2019/126931 A1 | 7/2019 |

OTHER PUBLICATIONS

International Search Report and Written Opinion for PCT/US2021/026555 dated Jul. 12, 2021, all pages.

(Continued)

*Primary Examiner* — Mariela Vidal Carpio
(74) *Attorney, Agent, or Firm* — Kilpatrick Townsend & Stockton LLP (57) ABSTRACT

Various arrangements for managing cellular network slicing are detailed. A cellular network management system may obtain performance data from cellular network components of a cellular network over time. The cellular network management system may analyze the performance data from the plurality of cellular network components to create a cellular network model indicative of performance of discrete portions of the cellular network over time. A service request may be received from an external entity that defines quality of service (QoS) parameters. A cellular network access conditions package may be created that defines conditions under which the external entity is eligible to utilize the (Continued)

cellular network. Cellular network components may then be configured to permit access to the cellular network by user equipment (UE) of the external entity and data services may be provided to the UE.

20 Claims, 7 Drawing Sheets

(56) References Cited

U.S. PATENT DOCUMENTS

| | | | | |
|---|---|---|---|---|
| 2011/0096732 | A1* | 4/2011 | Rashid | H04L 47/283 370/329 |
| 2011/0235507 | A1* | 9/2011 | You | H04W 12/08 370/230 |
| 2012/0016995 | A1* | 1/2012 | You | H04L 65/1016 709/226 |
| 2012/0278864 | A1* | 11/2012 | Dugeon | H04L 29/06 726/4 |
| 2014/0024383 | A1* | 1/2014 | Rahman | H04L 45/22 455/445 |
| 2014/0133456 | A1* | 5/2014 | Donepudi | H04W 64/003 370/331 |
| 2016/0105821 | A1* | 4/2016 | Senarath | H04W 76/00 370/329 |
| 2017/0251111 | A1* | 8/2017 | Sood | H04M 15/854 |
| 2018/0191635 | A1* | 7/2018 | Karthikeyan | H04L 45/302 |
| 2020/0187303 | A1* | 6/2020 | Donepudi | H04W 88/10 |
| 2020/0267053 | A1* | 8/2020 | Zheng | H04L 67/1008 |
| 2020/0314685 | A1* | 10/2020 | Jornod | H04W 4/44 |
| 2021/0021646 | A1* | 1/2021 | Chiang | H04W 76/18 |
| 2021/0065118 | A1* | 3/2021 | Notani | G06Q 10/101 |

OTHER PUBLICATIONS

Continental Automotive GMBH: "Discussion of Physical Layer Aspects of QoS Prediction for NR V2X," 3GPP Draft; R1-1813112, $3^{rd}$ Generation Partnership Project (3GPP), Mobile Competence Centre; 650, Routes des Lucioles; F-06921 Sophia-Antipolis Cedex; France, vol. RAN WG1, No. Spokane, USA; Nov. 12, 2018-Nov. 16, 2018, Nov. 11, 2018, XP051555093, Retrieved from the Internet: URL: http://www.3gpp.org/ftp/Meetings%5F3GPP%5FSYNC/RAN1/Docs/R1%2D1813112%2Ezip [retrieved on Nov. 11, 2018] p. 2, paragraphs 1, 2, 4.

* cited by examiner

CELLULAR NETWORK CAPACITY SLICING SYSTEMS AND METHODS

BACKGROUND

The architecture of cellular networks can be complex. Similarly, the demands of users on the cellular network can be complex in that demand varies significantly with time and location. An external entity that desires wireless access to a cellular network may contact a network administrator to gain access. Typically, a standard set of terms is provided to a client defining the conditions of their access. Such an arrangement may not be optimal because it does not take into account the network loads being experienced by the cellular network at the locations and times expected to be used by the client. Arrangement detailed herein are focused on how to effectively apportion capacity on a cellular network based on the requirements of clients and the capabilities of the cellular network.

SUMMARY

Various embodiments are described related to a method for managing cellular network slicing. In some embodiments, a method for managing cellular network slicing is described. The method may comprise obtaining, by a cellular network management system, performance data from a plurality of cellular network components of a cellular network over time. The plurality of cellular network components may comprise radio access network (RAN) components and cellular network data centers of the core cellular network. The method may comprise analyzing, by the cellular network management system, the performance data from the plurality of cellular network components to create a cellular network model indicative of performance of discrete portions of the cellular network over time. The method may comprise receiving, by the cellular network management system, a service request from an external entity distinct from an entity operating the cellular network and cellular network management system. The service request may define a plurality of quality of service (QoS) parameters requested by the external entity. The method may comprise analyzing, by the cellular network management system, the cellular network model to determine that the cellular network has sufficient available resources to satisfy the plurality of QoS parameters of the service request. The method may comprise creating, by the cellular network management system, a cellular network access conditions package. The cellular network access conditions package may define one or more conditions under which the external entity may be eligible to utilize the cellular network. The method may comprise transmitting, by the cellular network management system, the cellular network access conditions package to the external entity. The method may comprise receiving, by the cellular network management system, acceptance of the cellular network access conditions package from the external entity. The method may comprise configuring, by the cellular network management system, at least some of the plurality of cellular network components to permit access to the cellular network by user equipment (UE) of the external entity in accordance with the cellular network access conditions package. The method may comprise providing, by the cellular network, data services to the UE of the external entity in accordance with the cellular network access conditions package.

Embodiments of a such a method may include one or more of the following features: the plurality of QoS parameters may comprise an indication of a location where the QoS parameters are to be met. The performance data obtained from the plurality of cellular network components of the cellular network may comprise radio congestion data for the location where the QoS parameters are to be met. The cellular network access conditions package may comprise matching QoS parameters that may exactly match the QoS parameters of the service request. The QoS parameters of the service request may comprise a time period defining when the QoS parameters are requested to be realized. The cellular network access conditions package may comprise a first set of modified QoS parameters that differ from the QoS parameters of the service request. The cellular network access conditions package further may comprise a second set of QoS parameters that may match the QoS parameters of the service request. The cellular network access conditions package further may comprise a first price mapped to the first set of QoS parameters and a second price mapped to the second set of QoS parameters. The cellular network access conditions package may be indicative of a price.

In some embodiments, a cellular network management system is described. The system may comprise a communication interface that communicates with a plurality of cellular network components of a cellular network. The system may comprise one or more processors in communication with the communication interface. The system may comprise a memory storing instructions that, when executed by the processor, configure the apparatus to obtain performance data from the plurality of cellular network components of the cellular network over time via the communication interface. The apparatus may analyze the performance data from the plurality of cellular network components to create a cellular network model indicative of performance of discrete portions of the cellular network over time. The apparatus may receive a service request from an external entity distinct from an entity operating the cellular network and cellular network management system. The service request may define a plurality of quality of service (QoS) parameters requested by the external entity. The apparatus may analyze the cellular network model to determine that the cellular network has sufficient available resources to satisfy the plurality of QoS parameters of the service request. The apparatus may create a cellular network access conditions package. The cellular network access conditions package may define one or more conditions under which the external entity may be eligible to utilize the cellular network. The apparatus may transmit the cellular network access conditions package to the external entity. The apparatus may receive acceptance of the cellular network access conditions package from the external entity. The apparatus may configure at least some of the plurality of cellular network components to permit access to the cellular network by user equipment (UE) of the external entity in accordance with the cellular network access conditions package.

Embodiments of such a system may include one or more of the following features: the plurality of QoS parameters may comprise an indication of a location where the QoS parameters are to be met. The performance data obtained from the plurality of cellular network components of the cellular network may comprise radio congestion data for the location where the QoS parameters are to be met. The cellular network access conditions package may comprise matching QoS parameters that exactly match the QoS parameters of the service request. The QoS parameters of the service request may comprise a time period defining when the QoS parameters are requested to be realized. The cellular network access conditions package may comprise a first set of modified QoS parameters that differ from the QoS parameters of the service request. The cellular network access conditions package may further comprise a second set of QoS parameters that match the QoS parameters of the service request. The cellular network access conditions package may further comprise a first price mapped to the first set of QoS parameters and a second price mapped to the second set of QoS parameters. The cellular network access conditions package may be indicative of a price.

In some embodiments, a non-transitory computer-readable storage medium is described. The medium may include instructions that when executed by a computer, cause the computer to obtain performance data from a plurality of cellular network components of a cellular network over time. The plurality of cellular network components may comprise radio access network (RAN) components and cellular network data centers of the core cellular network. The medium may analyze the performance data from the plurality of cellular network components to create a cellular network model indicative of performance of discrete portions of the cellular network over time. The medium may receive a service request from an external entity distinct from an entity operating the cellular network and cellular network management system. The service request may define a plurality of quality of service (QoS) parameters requested by the external entity. The medium may analyze the cellular network model to determine that the cellular network has sufficient available resources to satisfy the plurality of QoS parameters of the service request. The medium may create a cellular network access conditions package. The cellular network access conditions package may define one or more conditions under which the external entity may be eligible to utilize the cellular network. The medium may transmit the cellular network access conditions package to the external entity. The medium may receive acceptance of the cellular network access conditions package from the external entity. The medium may configure at least some of the plurality of cellular network components to permit access to the cellular network by user equipment (UE) of the external entity in accordance with the cellular network access conditions package.

Embodiments of a such a medium may include one or more of the following features: the plurality of QoS parameters may comprise an indication of a location where the QoS parameters are to be met. The performance data obtained from the plurality of cellular network components of the cellular network may comprise radio congestion data for the location where the QoS parameters are to be met.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Determining the conditions under which a client should be permitted to join a cellular network can be complicated. A client may desire to use a particular cellular network for phone service, to access the Internet generally, or access a particular remote server system or cloud service provider. The client may have some number of pieces of user equipment (UE) (e.g., dozens, hundreds, thousands, etc.) that would be accessing the cellular network. Additionally or alternatively, the client may have specific needs as far as required network bandwidth, minimum acceptable packet loss and/or maximum tolerable latency and jitter (which is the delay variation in transferring packets) to communicate with various remote server system which can be a function of time and location. For instance, a video provider that intends on using the cellular network to stream video may require that various quality of service (QoS) parameters be met and these requirements can be a function of the service parameters, time and location.

Conventionally, a cellular network operator may define QoS parameters that the cellular network can be expected to meet over a large geographic area. However, such QoS parameters may not be accurate as to what the cellular network can realize in particular discreet locations. The capabilities of the cellular network may vary substantially by geographic location depending on the deployed resources of the cellular network. Factors of whether the cellular network is able to support the QoS parameters requested by a client may vary substantially based on location at which the cellular network is accessed, the time of day of such access, and the day of week of such access. For example, a cellular network may have substantially more bandwidth available at night compared to during the day. In this example, the cellular network may be able to meet particular QoS parameters during the night in specific locations, but not during the day due to other commitments and network constraints.

Embodiments detailed herein are focused on providing a client with a cellular access network condition package that define conditions under which the client is permitted to have its UE access the cellular network. Cellular access network condition packages can take into account factors such as: the number of UE; the location of UE; the amount of bandwidth desired in particular locations; the amount of latency permitted in particular locations; the days of the week QoS parameters must be met; the times of day that QoS parameters must be met, etc. Cellular access network condition packages may be constructed taking into account the historical, current, and predicted performance of the cellular core network and the radio access network (RAN) of the cellular network. For instance, the amount of radio resources in a given location that can be dedicated to a particular client may be determined. A client may choose to access the cellular access network condition package, resulting in the cellular network being configured for the UE of the client to have access to the cellular network. Alternatively, in response the client may choose to reject the cellular access network condition package or provide a new request with modified requirements.

Figure 1:
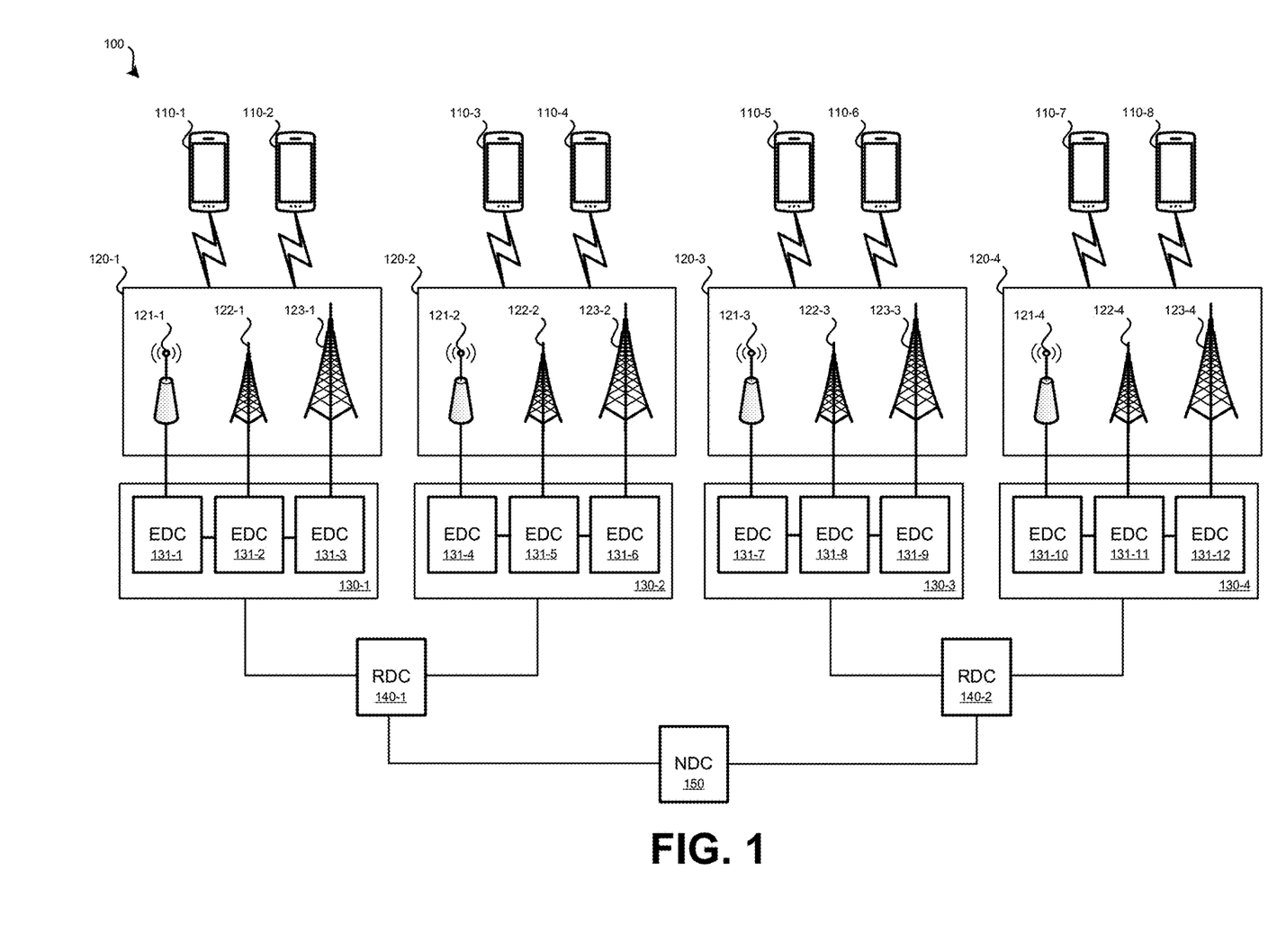
FIG. 1 illustrates an embodiment of a hierarchical cellular network.

Further detail regarding such embodiments and other embodiments is provided in relation to the figures. FIG. 1 illustrates an embodiment of a hierarchical cellular network system 100 ("system 100"). A cellular network can include a radio access network (RAN) and a core cellular network. UE 110 may connect with the cellular network using various types of base stations or access points. UE can include: cellular phones; smart phones; video cameras; audio streaming devices; video streaming devices; modems; sensor devices; or any other form of wireless device that communicates with a cellular network. UE 110 may be in different geographical locations and may therefore use different components of the RAN of the cellular network to communicate with the cellular network.

UE 110-1 and UE 110-2, based on where they are located, may communicate with some or all of RAN components 120-1. RAN components 120-1 can include local AP 121-1, small BS 122-1, and large BS 123-1 (e.g., a gNodeB in a 5G New Radio (NR) cellular network). Local AP may provide coverage to a relatively small geographic area, such as within a house or building. Small BS 122-1 may provide cellular network access over an intermediate-sized geographical region and may have a capacity to handle fewer instances of UE than other base stations. For instance, small BS 122-1 may be installed in an urban environment to provide access within a neighborhood. Large BS 123-1 may provide cellular network coverage to a relatively large geographic area, such as along a highway or to cover a large neighborhood. Large BS 123-1 may have a capacity to handle a greater number of instances of UE than a small BS.

UE associated with particular clients may have reserved amounts of wireless bandwidth. Therefore, in particular cells of hierarchical cellular network system 100, even if there is not a high amount of wireless traffic between UE and base stations (and/or access points), wireless radio resources of the RAN may be required to be reserved in order to fulfill previously-agreed to QoS metrics for particular clients.

Local AP 121-1, small BS 122-1, and large BS 123-1 may be part of a cellular network that operates according to one or more radio access technologies (RATs). For instance, the cellular network may be a 5G NR, 4G LTE, 3G, or GSM-based cellular network. Cellular networks may operate according to multiple RATs. For instance, a cellular network may be a hybrid 4G and 5G network.

Each of local AP 121-1, small BS 122-1, and large BS 123-1 may communicate with an edge data center (EDC). In some embodiments, a dedicated EDC may be used for each component or each type of component of the RAN. For example, EDC 131-3 may be dedicated to large BS 123-1. In other embodiments, EDC 131-3 may serve multiple base stations in a geographic region. EDC 131-2 may be dedicated to small BS 122-1 or may serve multiple base stations (e.g., only small base stations or a mix of different size base stations). Similarly, EDC 13-1 may be dedicated to local AP 121-1 or a group of local APs.

Group of EDCs 130-1 may serve as the interface of the cellular core network and may communicate with the components of the RAN. EDCs 131-1, 131-2, and 131-3 may perform routing of data within the cellular core network. For example, data received by EDC 131-2 intended for UE in communication with large BS 123-1 may be routed to EDC 131-3 directly. However, not all EDCs 131 communicate directly with each other. For instance, EDC 131-4 may not communicate directly with EDC 131-2. Therefore, if EDC 131-2 is routing data to an UE in communication with EDC 131-3, the data may need to be routed via another data center of the cellular core network, such as through regional data center (RDC) 140-1. In this example, RDC 140-1 serves as an intermediary node that routes data between EDC 131-2 and EDC 131-4.

Each RDC, such as RDC 140-1, may serve primarily to route data among different data centers. RDC 140-1 may be in communication with multiple EDCs. If data is to be routed among EDCs in direct communication with RDC 140-1, components higher in the hierarchy of the cellular core network may not need to be involved in the routing of data. However, if data is being routed to an EDC not in direct communication with RDC 140-1, a component higher in the hierarchy of the cellular core network may need to be used to complete the routing.

National data center (NDC) 150 can represent the highest level in the cellular network hierarchy of system 100. NDC 150 may communicate with all RDCs 140 of the cellular core network. In turn, all of RDCs 140 may be in communication with the EDCs 131 of the cellular network. Such a hierarchy can allow for data anywhere within the cellular network to be routed to other devices. EDCs, RDCs, and NDCs can collectively be referred to as nodes of the core cellular network.

As can be seen in FIG. 1, the configuration of RAN components 120-1 and group of EDCs 130-1 may be replicated in other geographic regions: UEs 110-3 and 110-4 communicate with RAN components 120-2 (local AP 121-2, small BS 122-2, large BS 123-2), which communicate with group of EDCs 130-2; UEs 110-4 and 110-5 communicate with RAN components 120-3 (local AP 121-3, small BS 122-3, large BS 123-3), which communicate with group of EDCs 130-3; and UEs 110-7 and 110-8 communicate with RAN components 120-4 (local AP 121-4, small BS 122-4, large BS 123-4), which communicate with group of EDCs 130-4. Group of EDCs 130-2 (which includes EDCs 131-4, 131-5, and 131-6) communicate with RDC 140-1. Group of EDCs 130-3 (which includes EDCs 131-7, 131-8, and 131-9) and group of EDCs 130-4 (which includes EDCs 131-10, 131-11, and 131-12) communicate with RDC 140-2. RDC 140-2 communicates with NDC 150.

In the example of system 100, only a small number of components are illustrated. For example, only UE 110-3 and UE 110-4 are shown as in communication with RAN components 120-2. In reality, a much larger number of UE may use RAN components 120-2 to communicate with the cellular network. Similarly, each group of RAN components 120 may include many more local APs 121, small BSs 122, and/or large BSs 123. Fewer or greater numbers of EDCs 131 may be present. There are fewer or greater numbers of levels within the hierarchy within the core cellular network. For example, in a cellular network if a greater number of EDCs are present, one or more additional levels in the hierarchy below the NDC may be present.

Figure 2:
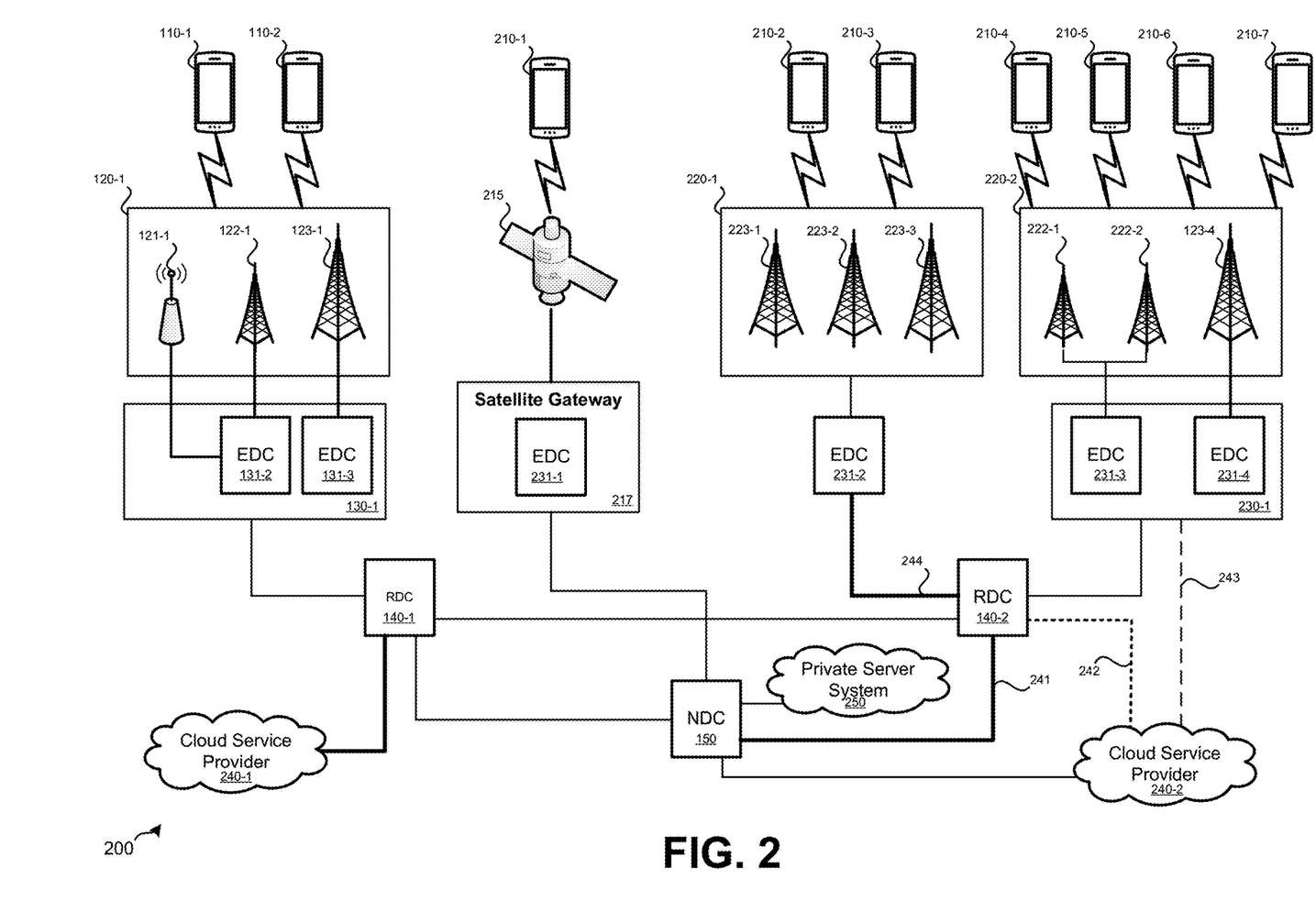
FIG. 2 illustrates an embodiment of a more complex hierarchical cellular network.

In system 100, the hierarchy is symmetrical in that each grouping of RAN components 120 contains a local AP, small BS, and a large BS. Each of the RAN components is in communication with an EDC, and each group of EDCs is in communication with an RDC, which is in communication with an NDC. Such an arrangement is unlikely to be implemented in the real-world due to variances in the density of UEs in a given area, variations in the amount of uplink and downlink traffic by UEs in a given area, variations in geography, temporal usage trends, where UE tend to congregate, connections with cloud-service providers, and availability of bandwidth. FIG. 2 illustrates an embodiment of a more complex hierarchical cellular network more representative of a real-world cellular network hierarchy that may be present.

In system 200, variations in components within the cellular network may exist. UE 110-1 and UE 110-2 may communicate with RAN components 120-1 as described in relation to system 100. However, in system 200, only two EDCs may be present in group of EDCs 130-1 and each EDC of group of EDCs 130-1 may not be able to communicate directly with each other. Each EDC of group of EDCs 130-1 may communicate with RDC 140-1.

Various components, such as RDC 140-1 and NDC 150, may communicate with cloud service providers (CSPs) 240. CSPs may represent third-party service providers that provide storage and processing functionality that can be used by various entities. For instance, a client that may operate a variety of UEs on system 200 may have storage and processing functions hosted by either cloud service provider 240-1 or CSP 240-2. Additionally or alternatively, an entity may operate a private server system, such as private server system 250, that has storage and processing capabilities dedicated to the entity. CSPs 240 and private server system 250 may only have dedicated bandwidth with certain components of the cellular core network. For example, cloud service provider 240-1 has dedicated bandwidth with RDC 140-1. Therefore, for example, if UE 210-6 requests data from CSP 240-1, the request would possibly be routed through RDC 140-2, NDC 150, and RDC 140-1 or RDC 140-2 and RDC 140-1.

In system 200, not all wireless communication may be terrestrial. Rather, UE 210-1 may be a satellite modem or satellite phone that communicates via a low earth orbit (LEO), middle earth orbit (MEO), or geosynchronous earth orbit (GEO) satellite 215. Satellite 215 may relay communications between UE 210-1 and satellite gateway 217, which can include or be in communication with EDC 231-1. As a possible deviation from the hierarchy of system 100, rather than EDC 231-1 being in communication with an RDC, EDC 231-1 may communicate directly with NDC 150. Therefore, for example, if data is to be routed by UE 210-1 to UE 110-1, EDC 231-1 may route the data through NDC 150 to RDC 140-1 to EDC 131-2.

In system 200, not every group of RAN components includes the same equipment. For example, group of RAN components 220-1 includes three large BSs 223-1, 223-2, and 223-3 which are all serviced by EDC 231-1. In the example of FIG. 2, there is a high volume of UE (as represented by UE 210-4, UE 210-5, UE 210-6, and UE 210-7) communicating with group of RAN components 220-2. RAN components 220-2, which includes two small base stations 222-1 and 222-3 and a single large BS 123-4, are serviced by two EDCs, 231-3, and 231-4 of group of EDCs 230-1. Group of EDCs 230-1 has dedicated bandwidth to communicate with CSP 240-2. Therefore, it should be understood that the number and types of RAN components that communicate with an EDC can vary. Further, the components of the cellular core network that the EDC communicates with can also vary.

The amount of bandwidth available between components of the cellular core network may be adjusted such that certain performance metrics can be realized. For example, UEs 210-2 and 210-3 may require a certain minimum quality of service (QoS) metric (e.g., latency, jitter, packet loss, bandwidth, etc.) be met for communication with some remote system, such as private server system 250. In order to meet the QoS metric, additional dedicated bandwidth 244 may be established between EDC 231-2 and RDC 140-2 and dedicated bandwidth 241 may be established between RDC 140-2 and NDC 150.

Dedicated bandwidth within the hierarchy of the cellular core network may be established between components to help realize particular QoS metrics. For instance, RDC 140-1 and RDC 140-2 may have direct dedicated bandwidth between them, such as to increase the bandwidth and decrease the latency for EDC 231-1 and EDC 231-3 to access CSP 240-1.

System 200 may be able to accommodate smart routing, which can be used to compensate for unavailable connections. For instance, RDC 140-2 may typically have dedicated bandwidth 242 to CSP 240-2; however, dedicated bandwidth 242 may not be available due to a problem or maintenance being performed. Data that would be routed directly between RDC 140-2 and CSP 240-2 can instead be routed via NDC 150.

In system 200, the amount of bandwidth between RAN components 120 and UE 110 may be assigned based on bandwidth QoS parameters of various clients. Therefore, in a given location, a particular client may have a reserved "slice" of the available radio resource blocks. When UE of the client are not using their reserved bandwidth, the bandwidth may be used to service UE of other clients. It also may be possible to overbook the bandwidth on the assumption that not all clients will request their maximum permitted amount of bandwidth at the same time. The amount of unreserved radio bandwidth at given locations may be factored into whether and under what conditions service will be provided to any new entities.

The number and arrangement of UEs, BSs, EDCs, RDCs, NDC, CSPs, and private server systems of system 200 are merely examples. Further, the connections between such components are merely an example of how such a network can be arranged. A real-world cellular network deployed over a large geographical area would be significantly more complex and include a greater number of components.

Figure 3:
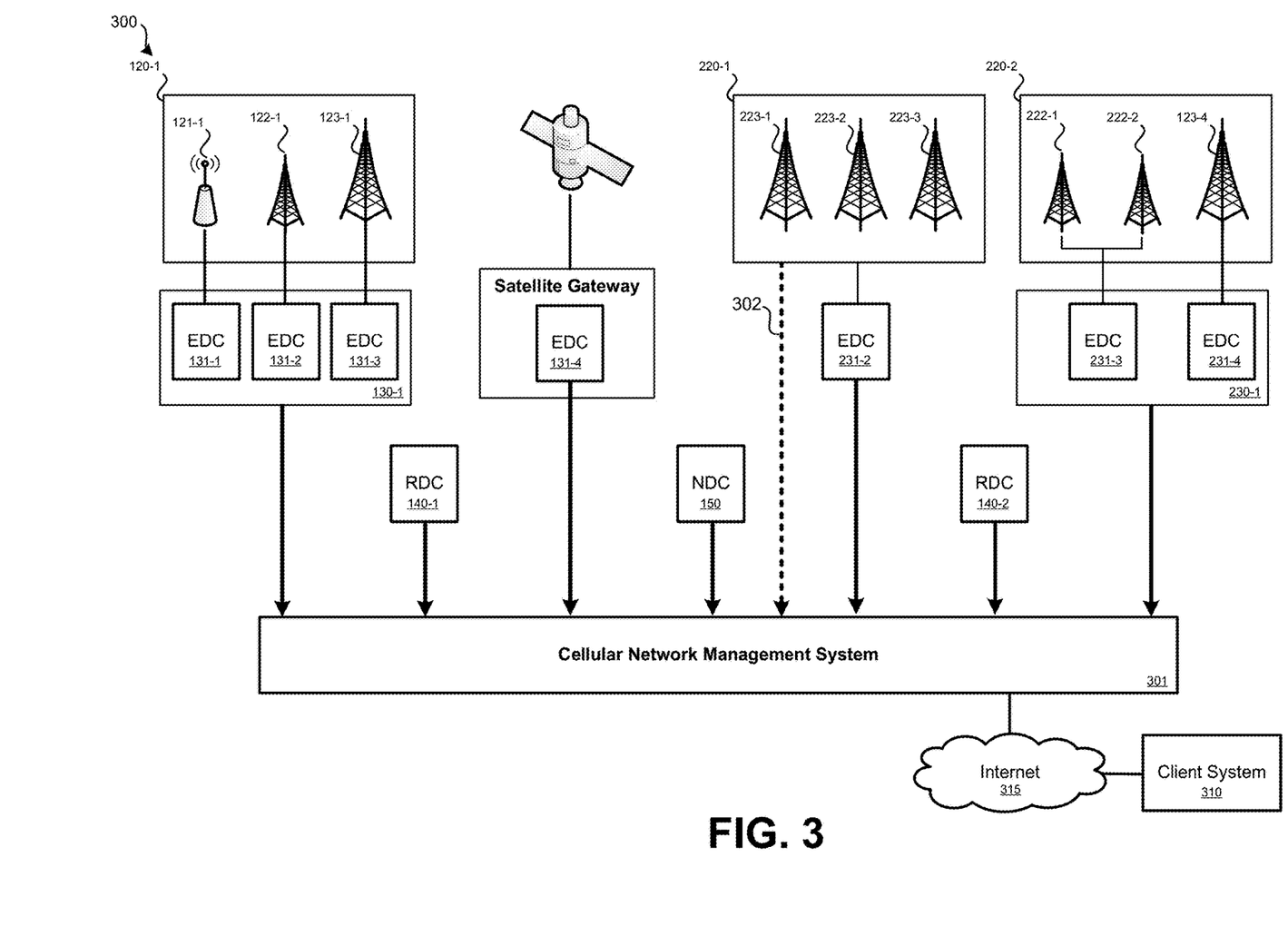
FIG. 3 illustrates an embodiment of a core network management system operating within a core network of a cellular network.

FIG. 3 illustrates an embodiment of a cellular network management system operating within a core network of a cellular network system 300. Cellular network system 300 can represent an embodiment of system 200 with the addition of cellular network management system (CNMS) 301.

CNMS 301 can be implemented using a server system that obtains performance data from the various components of the cellular core network. CNMS 301 may request or may automatically receive status data (which can be time-stamped) from all EDCs, RDCs, and an NDC of a cellular core network. If a greater number of tiers of components are present in a cellular network's core network, CNMS 301 receives status data from such components also. The status data received by CNMS 301 can include: number of UEs being serviced; amount of bandwidth used; amount of bandwidth available; packet loss; latency; and jitter between components of the core network; and connections available in the core network. CNMS 301 from EDCs may receive performance data about RAN components. For instance, CNMS 301, from an EDC, may receive status data indicating: available radio resources, radio bandwidth, radio performance metrics and number of UE actively communicating with a BS or local AP.

CNMS 301 may collect such status data for multiple purposes. First, the status data may be used to create a model of the current end-to-end performance of the cellular core network and RAN and the capabilities of the cellular core network and RAN. Second, the status data may be used to produce a usage model of the cellular network over time. For instance, various portions of the cellular core network and RAN may be highly utilized during certain times of the day or during certain events (e.g., a sporting event that results in a large number of UEs being present at a location, such as a stadium).

In some embodiments, each component of the cellular network periodically or occasionally sends status data to CNMS 301. In other embodiments, CNMS 301 transmits queries to each component of the cellular network and, in response, receives status data. In still other embodiments, a mix of queries and periodic or intermittent reporting is used. Additionally or alternatively, RAN components 120 may transmit usage data to CNMS 301. RAN components 120 may transmit data indicative of radio resources being used and/or available between UE and the RAN component transmitting the data. Therefore, for example, large BS 223-1 may transmit performance data indicative of the usage of radio resources to CNMS 301 as performance data 302. For example, such performance data could indicate a number or percentage of available resource blocks on the RAN (a resource block being a defined timeslot on a subcarrier frequency during which a number of OFDM signals can be transmitted). Depending on the embodiment, RAN components may relay such performance data to CNMS 301 via the cellular network system 300, such as via EDC 231-2. In other embodiments, RAN components, such as a gNodeB of large BS 223-1, may transmit performance data to CNMS 301 directly.

Client system 310 can include one or more server system that allow a client to send service requests to CNMS 301 via a network, such as the Internet 315, to CNMS 301. CNMS 301 can respond with a cellular network access conditions package to client system 310. It should be understood that many client systems may be in communication with CNMS 301 via Internet 315 and/or via other networks.

Figure 4:
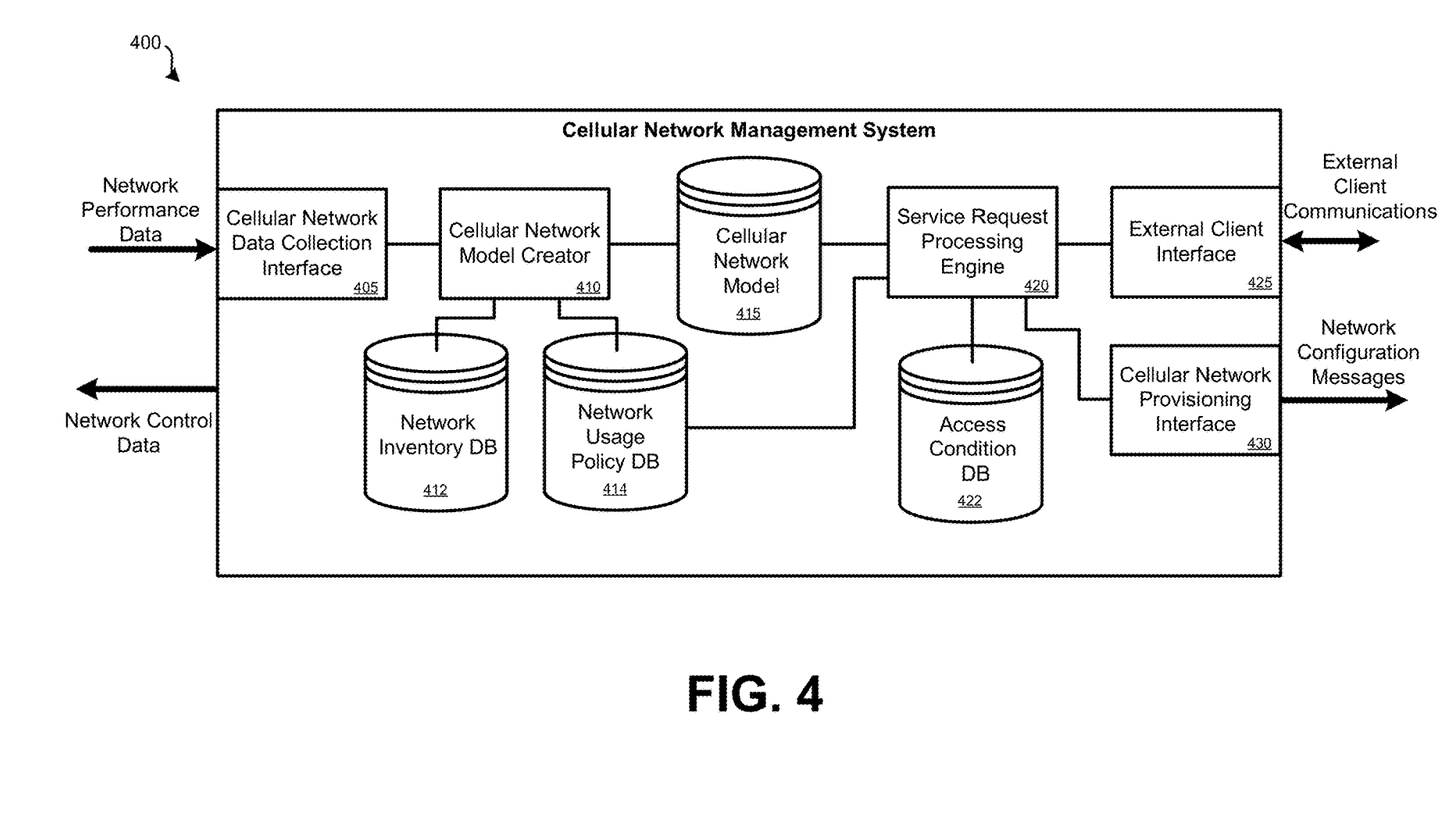
FIG. 4 illustrates an embodiment of a core network management system.

FIG. 4 illustrates an embodiment of a cellular network management system 400 ("CNMS 400"). CNMS 400 can represent an embodiment of CNMS 301 of FIG. 3. CNMS 400 can include: cellular network data collection interface 405 ("interface 405"); cellular network model creator 410 ("model creator 410"); network inventory DB 412; network usage policy DB 414; cellular network model 415; service request processing engine 420; access condition DB 422; external client (or entity) interface 425; and cellular network provisioning interface 430. CNMS 400 may be implemented using one or more computer server systems that include one or more non-transitory processor readable mediums and one or more processors. Various components of CNMS 400 can be implemented using special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Interface 405 may receive status data from each component of the cellular core network and the cellular network's RAN components. Interface 405 may query cellular core network components for such data or may periodically or intermittently receive such data. Status data (which can include performance data), as it is received, may be passed to cellular network model creator 410. Interface 405 may pass this data to model creator 410, which may collect status/performance data for a period of time (e.g. several seconds, several minutes, for an hour, etc.) and create a dataset that represents the current properties of the cellular network, including used and available capacity, packet loss, latency, and jitter between nodes, used and available bandwidth, used and available radio resources (e.g., resource blocks) per BS and AP, etc. Over time, cellular network model creator 410 may create a cellular network model 415 representative of performance of the cellular network over various times of the day, days of the week, months of the year, etc.

Cellular network model creator 410 may be in communication with network inventory database 412. Network inventory database 412 may store data that indicates the types of components of the RAN and cellular core network. Network inventory database 412 may also include a map of which nodes of the core cellular network can communicate directly with each other. Network inventory database 412 may also indicate the maximum bandwidth available between particular notes of the core cellular network and of the total radio resources available at particular RAN components.

Network usage policy DB 414 may define how the cellular network (or various portions of the cellular network) are permitted to be utilized. For example, radio resources may be permitted to be a percentage overbooked. Overbooking of radio resource can involve assigning a total amount of bandwidth to clients in a given region in different time periods of the cellular network that is greater than what the cellular network is capable of delivering. This arrangement relies on the principle that it is unlikely that all clients will be utilizing the client's maximum amount of bandwidth at any given time. By overbooking the amount of bandwidth available, the total amount of bandwidth of the cellular network at that location and at a point in time may be more efficiently used. The higher the percentage of overbooking, the more likely that the overbooking will result in clients being unable to realize their maximum amount of bandwidth. Network usage policy DB 414 may define a maximum percent that various portions of the cellular network is permitted to be oversubscribed (if at all).

Cellular network model creator 410 may use data received from cellular network data collection interface 405, network inventory database 412, and network usage policy DB 414 to create cellular network model 415. Cellular network model 415 may present an accurate snapshot of the current performance and usage of all portions of the cellular network, including that of radio resources, along with predictions of how the cellular network will be utilized in various locations in the future based on historical data. For example, cellular network model 415 may be used to estimate likely usage of various portions of the cellular network for future weekday days, weekday nights, weekend nights, weekend days, special events (e.g., sporting events), etc.

Cellular network model creator 410 may also incorporate predictions into cellular network model 415. For example, while historical information may not indicate that a particular location on a coming particular day will have significant traffic on a particular portion of the cellular network, prediction data, such as that input by the administrator or determined by the system, can be used to adjust cellular network model 415. As an example of this, an upcoming scheduled festival (which has no historical analogous event at the location), sporting event schedule, or other form of special event may be expected to cause a significant increase in cellular network usage in a particular location. In some embodiments, cellular network model creator 410 may have access to information about sport team schedules, local civic events, holidays, festivals, etc.

Since cellular network model 415 uses historical and current cellular network performance across locations in combination with indications of the actual cellular network inventory (from network inventory DB 412), cellular network model 415 can be used to determine portions of the cellular network that are near capacity, under capacity, at capacity, or over capacity. The portions of the cellular network above, below, or at capacity can vary significantly based on location, time and date.

Ideally, the operator of the cellular network may desire to increase the overall usage of the cellular network and decrease usage of portions of the cellular network that are at or above capacity. Therefore, when a client desires to add UE to the cellular network, the operator of the cellular network may attempt to encourage the client to use the cellular network at a location and/or at a time when the cellular network has significant available capacity. The cellular network operator may perform such encouragement by adjusting the price offered to the client based on the amount of available network capacity available for the location, time, and/or day of the client's request.

External client interface 425 may serve to receive requests from clients the desire to access the cellular network using one or more UE. A client may submit a service request, such as via the Internet, to external client interface 425. The service request may include various parameters that the cellular network is required to meet and information about the UE. Parameters can include: number of UE; location of the UE; minimum bandwidth (per UE or total) required by location (to a particular server system); maximum latency (per UE or average) by location (to a particular server system); days and times at which the QoS parameters of bandwidth, packet loss, latency, and jitter must be met; date and/or time at which the service is to go into effect (or a date/time range when the service is to be in effect).

External client interface may pass the received parameters to service request processing engine 420. Service request processing engine 420 may determine: 1) whether it is possible for the network to meet the QoS parameters submitted by the client; and 2) under what conditions access to the cellular network should be granted. Service request processing engine 420 may access cellular network model 415 and determine whether current cellular network resources are sufficient to satisfy the service request. If current cellular network resources are not sufficient, depending on when the service is to go into effect, service request processing engine 420 may determine whether it is possible to modify the cellular network (e.g., by adding bandwidth, connections between nodes, etc.) before the service is to go into effect.

Service request processing engine 420 may access network usage policy DB 414 to determine what changes or modifications can be made to the cellular network and how quickly. For example, some changes may be able to be made almost instantaneously, such as purchasing or otherwise acquiring more bandwidth between nodes of the cellular core network. Other changes, such as increasing the number of UE or the amount of bandwidth between a BS and UE, may require physical upgrades to the RAN and may take days, weeks, or even months to implement. Further, in some situations, upgrades may not be possible. Network usage policy DB 414 may store indications of what connections and components are eligible to be upgraded and the time needed to perform such upgrades. In analyzing a service request by service request processing engine 420, such data from network usage policy DB 414 may be used to determine whether or not the service request can be met and/or the access conditions provided back to the client in response to the service request.

Service request processing engine 420 may further communicate with access condition DB 422. Access condition DB 422 can include rules and policies that are used to determine how service request processing engine 420 is to respond to a service request received via external client interface 425. Access condition DB 422 may be used to determine a price that is to be provided to the client in response to a service request. Service request processing engine 420, by analyzing cellular network model 415 and network usage policy DB 414 can determine: 1) whether the cellular network has current capacity to handle the service request or whether modifications to the cellular network is needed; and 2) whether the service request requests use of cellular network resources that are in low demand, mid demand, or high demand. Using the rules and policies and access condition DB 422 in combination with the determinations made by service request processing engine 420, an offered price to fulfill the service request may be determined. The offered price is a function of, but not limited to, demand, the existing and predicted network state, location, time, opportunity cost, marginal cost, average cost and the expected return on investment for each service request.

Service request processing engine 420 can transmit a response to the service request referred to as a cellular network access conditions package. The cellular network access conditions package can indicate whether or not the cellular network system is capable of fulfilling the service request. The cellular network access conditions package can further include a cost due to the cellular network operator in order for the service request to be fulfilled. The cellular network access conditions package may provide the service provider with the choice to accept or reject the cellular network access conditions package. If accepted, service request processing engine 420 may receive a response indicating the client's assent to the cellular network access conditions package. This affirmative response may trigger service request processing engine 420 to configure the cellular network in order to fulfill the service request. Cellular network provisioning interface 430 be used to configure the cellular network. This can include providing identifiers of the UE of the client to the relevant components of the cellular network. Cellular network provisioning interface 430 may also be used to communicate upgrades or modifications that need to be made to the cellular network in order to fulfill the service request. In some embodiments, modifications to the cellular network, such as acquiring additional bandwidth between nodes, may be performed directly by cellular network provisioning interface 430. Additionally or alternatively, messages may be sent to administrator indicating manual upgrades to the cellular network that need to be performed in order to fulfill the service request.

In addition to or in alternative service request processing engine 420 providing a response to the service request indicating that the service request can be fulfilled for price, various modifications can be indicated to the service request. Such modifications may permit the service request to be fulfilled or may permit the service request to be fulfilled at a different (e.g., lower) price than otherwise. Therefore, the cellular network access conditions package can include various alternatives that can be selected by the client. As an example, in a service request, the client may have requested that a particular QoS parameter be met between 1 PM and 5 PM. The cellular network access conditions package provided in response may indicate a first price for satisfying the service request, including the particular QOS parameter. The cellular network access conditions package may also include a second price, likely lower, for satisfying the service request but indicating that the QOS parameter would be met between 3 PM and 7 PM (e.g., when there is less cellular network traffic). Depending on the response provided by the client to the cellular network access conditions package, service request processing engine 420 may configure the cellular network, via the cellular network provisioning interface 430, appropriately.

In addition or in alternate to providing a cellular network access conditions package that includes one or more choices for the client to select from, one or more options may be included. An option, if acquired by the client, can allow the client to acquire cellular service (as specified by the service request or a modified version of the service request provided in response as part of the cellular network access conditions package) at a stated fixed price for up to a certain time in the future. Therefore, if the client is unsure as to whether cellular network access is needed by the client at some point in the future, the client may decide to purchase an option for a service request. Up to the certain time in the future the client can exercise the option for the associated fixed-price or may allow the option to lapse. Regardless of whether the client decides to exercise the option or allows the option to lapse, a fee may be required to be paid in order to acquire the option from the cellular service provider via service request processing engine 420. Service request processing engine 420 may use data from: the service request, cellular network model 415, network usage policy DB 414, and access condition DB 422 to determine how an option should be priced. Multiple versions of the option may be presented that have different periods of time during which the option can be exercised.

Figure 5:
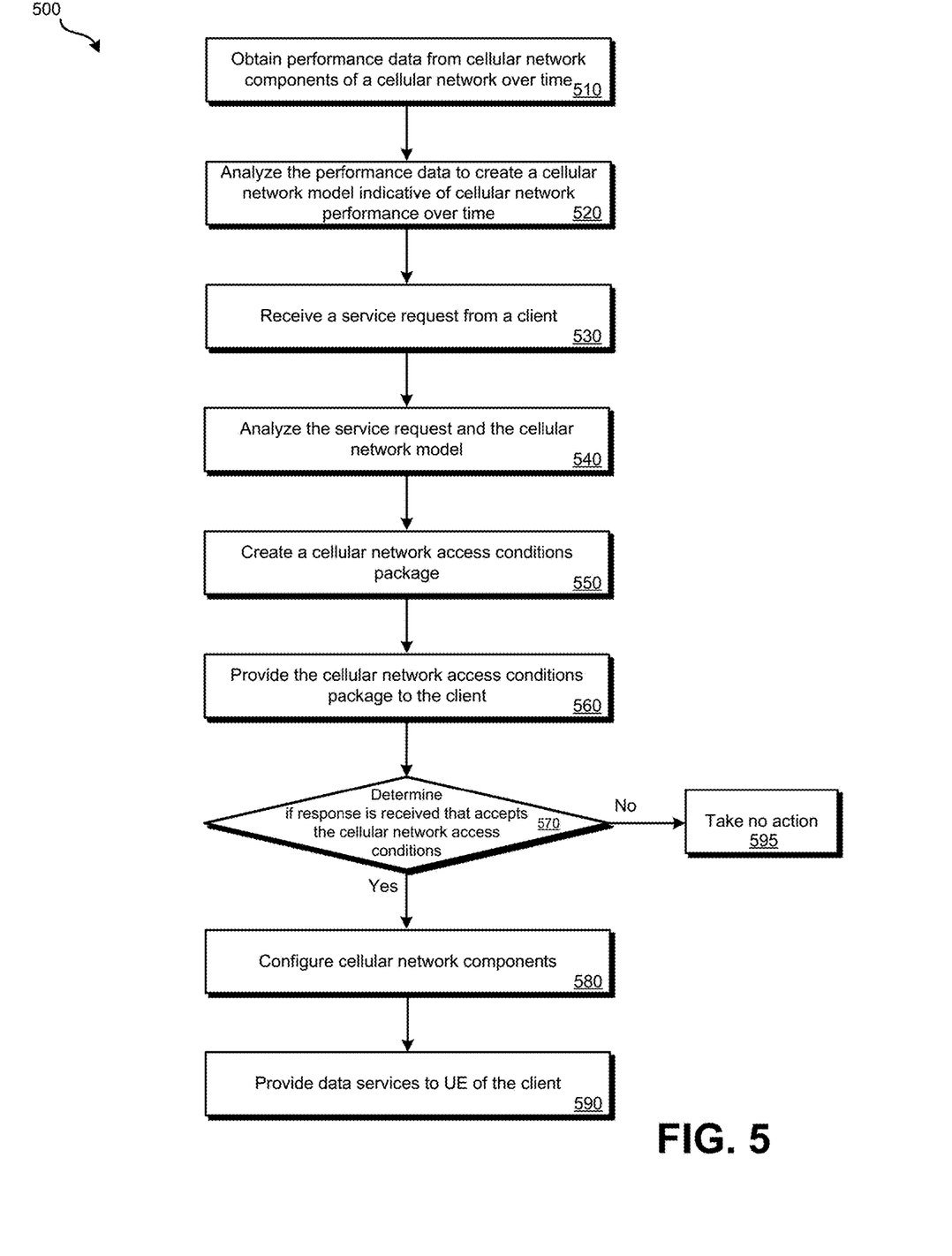
FIG. 5 illustrates an embodiment of a method for managing cellular network slicing.

Various methods may be performed using the various embodiments of cellular network systems and CNMSs detailed in relation to FIGS. 1-4. FIG. 5 illustrates an embodiment of a method 500 for managing cellular network slicing. Method 500 may be performed using a system, such as detailed in relation to FIGS. 1 and 2 (but likely having variations in its hierarchy) and a CNMS, such as detailed in relation to FIGS. 3 and 4. The CNMS may function as part of the cellular network system or may be in communication with the cellular network (e.g., the CNMS may function outside of the cellular network, but may receive data about the cellular network).

At block 510, performance data may be obtained from some or all core cellular network nodes and RAN components. The performance data may be received by a CNMS that monitors the entirety of the cellular network. The performance data may indicate how the specific cellular network component is currently performing. The performance data can indicate data such as: current experienced latency and jitter to other nodes of the cellular network; number of UE currently connected; packet loss; amount or percentage of total bandwidth being utilized; total available bandwidth; number or percent or radio resource blocks being used.

At block 520, a cellular network model may be created or updated based on the performance data received. The cellular network model may reflect loads and capacities of the cellular network over time. Based on the historical performance data received over time at block 510, the performance of individual cellular network components may be modelled over time. Therefore, for specific times of the day, days of the week, etc. the performance of individual network components can be modelled. The model created at block 520 may be used to predict the loads that will exist on various parts of the cellular network at different times and what resources will likely be available or will be used.

At block 530, a service request may be received by the CNMS from a client. The client may be an entity separate from the operator of the cellular network that desires to acquire access to the cellular network for some number of UE. The service request may include data such as: indications of the UE for which service is desired; locations where the service is to be provided to the UE; one or more QoS parameters that are required to be met; one or more time periods during which the service is requested with the QoS parameters met; when the service is to commence. Table 1 represents an example of a service request that may be sent by a client.

TABLE 1

| | |
|---|---|
| UE Identifiers | UE_ID#1; UE_ID#2; ... UE_ID#N |
| Commencement Time/Date | 4/27/2020 @ 4:00:00 AM |
| Geographic Area | Location Identifier |
| QoS Parameter #1 | 3.5 Mbps bandwidth (total) |
| QoS Parameter #2 | <20 ms latency to AWS_location_4 |
| QoS Parameter #3 | <0.5% end to end packet loss |
| QoS Parameter #4 | <10 ms end to end jitter |
| Time period for QoS parameters | Weekdays, 6 AM-8 PM |

At block 540, the service request received at block 530 may be analyzed in combination with the cellular network model created at block 520. Additionally or alternatively, the service request may be analyzed in combination with various network usage policies and access conditions. Network usage policies may specify how the network can be utilized in order to fulfill the service request, such as an amount of oversubscription permitted. Access conditions may include various rules and policies that are used to determine: 1) whether the cellular network can fulfill the service request; and 2) how the service request should be priced based at least in part on data obtained from the cellular network model. Therefore, pricing is at least partially dependent on the performance and utilization of portions of the cellular network that will be used to fulfill the service request.

Block 550, a cellular network access conditions package may be created. The cellular network access conditions package may indicate whether or not the service request can be fulfilled and may include one or more alternatives for the client to evaluate which include deviations from the original service request received at block 530. The cellular network access conditions package may include indications of whether the service request can be filled as is and a price. Table 2 provides an example of a cellular network access conditions package that includes one alternative.

TABLE 2

| | |
|---|---|
| Primary Service Request | |
| Primary Request Availability | Yes |
| Price | $ USD |
| Alternative Service Package #1 | |
| Modified QoS Parameter #1 | 3.1 Mbps bandwidth (total) |
| Modified QoS Parameter #2 | <25 ms latency to AWS_location_4 |

TABLE 2-continued

| | |
|---|---|
| Modified QoS Parameter #3 | <0.75% end to end packet loss |
| Modified QoS Parameter #4 | <12 ms end to end jitter |
| Modified Time period for QoS parameters | Weekdays, 4 AM-6 PM |
| Price | $ USD |

While the example of Table 2 shows only a single alternative with multiple modified QoS parameters, it should be understood that additional or different alternatives may be presented with fewer numbers of modified QoS parameters.

At block 570, a determination may be made if a response has been received that accepts the cellular network access conditions package. If multiple alternatives were provided in the cellular network access conditions package, the response received and analyzed at block 570 may indicate which alternative the client has accepted. Block 570 may include payment being submitted by the client to a particular account or other location. Alternatively, at one 570, if a response is received that rejects all of the alternatives presented in the cellular network access conditions package, no action may be taken at block 595. Therefore, UE of the client will not be able to access the cellular network in accordance with any of the alternatives presented in the cellular network access conditions package.

If acceptance is received at block 570, method 500 may proceed to block 580 at which one or more components of the cellular network is configured in order to permit access in accordance with the accepted cellular network access conditions package. Block 580 can include performing a provisioning process or some other form of configuration that will allow the UE of the client to be able to access the cellular network in accordance with the cellular network access conditions package. If the cellular network access conditions package accepted by the client matches the initial service request provided by the client, the UE of the client may therefore receive access to the cellular network in accordance with the terms of the original service request. At block 590, cellular network services, such as data services, may be provided to the UE of the client in accordance with the accepted cellular network access conditions package.

Figure 6:
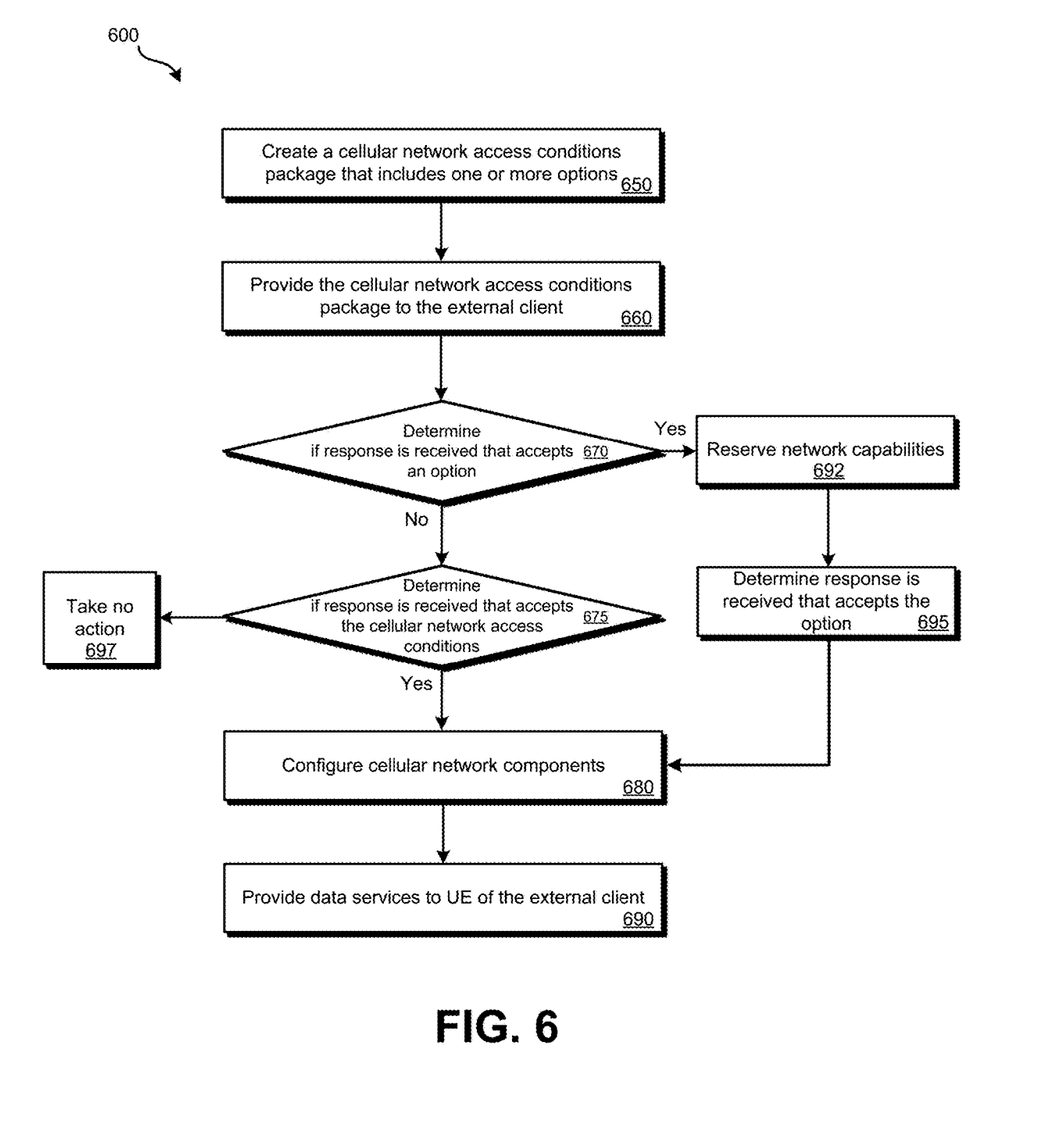
FIG. 6 illustrates an embodiment of a method for managing cellular network slicing using an option for reserving cellular network capabilities.

FIG. 6 illustrates an embodiment of a method 600 for managing cellular network slicing using an option for reserving cellular network capabilities. Method 600 may be performed using a system, such as detailed in relation to FIGS. 1 and 2 (but likely having variations in its hierarchy) and a CNMS, such as detailed in relation to FIGS. 3 and 4. The CNMS may function as part of the cellular network system or may be in communication with the cellular network (e.g., the CNMS may function outside of the cellular network, but may receive data about the cellular network). Method 600 may be performed as part of method 500 or a similar method.

As part of or separately from the cellular network access conditions package created at block 550, one or more options may be created at block 650. Options may only be created if specifically requested by the client as part of the service request. Options may be created by a service request processing engine using one or more rules or policies from an access condition DB in combination with data from a cellular network model. In some embodiments, as part of the service request, a client may indicate durations of time for which the client desires a quote for options. The options offered by the service provider may be at least in part based on the durations of time indicated as part of the service request. As an example of options, Table 3 shows the cellular network access conditions package of Table 2 to include two options for each alternative.

TABLE 3

| | |
|---|---|
| Primary Service Request | |
| Primary Request Availability | Yes |
| Price | $ USD |
| 1 Week Option: | $ USD |
| 2 Week Option: | $ USD |
| Alternative Service Package #1 | |
| Modified QoS Parameter #1 | 3.1 Mbps bandwidth (total) |
| Modified QoS Parameter #2 | <25 ms latency to AWS_location_4 |
| Modified QoS Parameter #3 | <0.75% end to end packet loss |
| Modified QoS Parameter #4 | <12 ms end to end jitter |
| Modified Time period for QoS parameters | Weekdays, 4 AM-6 PM |
| Price | $ USD |
| 1 Week Option: | $ USD |
| 2 Week Option: | $ USD |

At block 660, the cellular network access conditions package (which includes one or more options available) may be provided to the client.

At block 670, a response may be received which may be analyzed to determine if one of the options included in the cellular network access conditions package has been accepted. If yes, all or a percentage of the network capabilities required to realize the service indicated in the cellular network access conditions package may be reserved at block 692. Reservation of network capabilities can include ensuring that sufficient network capabilities are available for when the cellular network access conditions package is defined as being active. Other cellular network access conditions packages provided to other clients or the same client may factor in that these network capabilities have been reserved. Therefore, other service requests may need to be denied or may be only available at a higher price due to the reservation of network capabilities performed at block 692.

At block 695, a response may be received within the time period specified by the option that indicates the option is being exercised. This can include the client agreeing to pay the price previously provided as part of the cellular network access conditions package offered by the cellular network service provider. Method 600 may then proceed to block 680. If a response is not received within the time period specified by the option, the option may lapse and the previously reserved network capabilities may be no longer reserved and available for other clients.

If block 670 does not involve an option being accepted, method 600 may proceed to block 675. At block 675, a determination may be made if a response has been received that accepts the cellular network access conditions package. If multiple alternatives were provided in the cellular network access conditions package, the response received and analyzed at block 670 may indicate which alternative the client has accepted. Block 675 may include payment being submitted by the client to a particular account or other location. Alternatively, at block 675, if a response is received that rejects all of the alternatives presented in the cellular network access conditions package, no action may be taken at block 697. Therefore, UE of the client will not be able to access the cellular network in accordance with any of the alternatives presented in the cellular network access conditions package.

If acceptance is received at block 670, method 600 may proceed to block 680 at which one or more components of the cellular network is configured in order to permit access in accordance with the accepted cellular network access conditions package. Block 680 can include performing a provisioning process or some other form of configuration that will allow the UE of the client to be able to access the cellular network in accordance with the cellular network access conditions package. If the cellular network access conditions package accepted by the client matches the initial service request provided by the client, the UE of the client may therefore receive access to the cellular network in accordance with the terms of the original service request. At block 690, cellular network services, such as data services, may be provided to the UE of the client in accordance with the accepted cellular network access conditions package.

Figure 7:
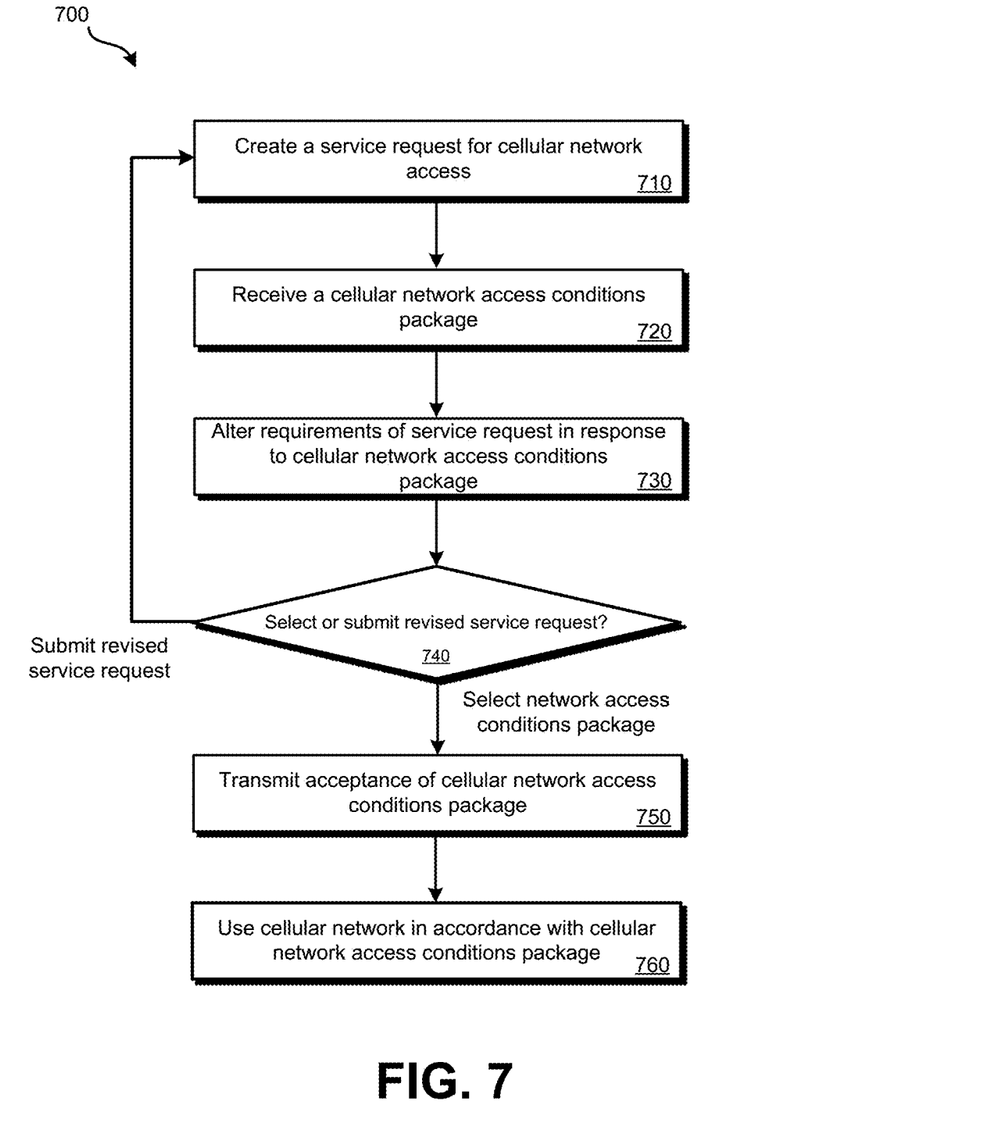
FIG. 7 illustrates an embodiment of a method for client-side management of reserving cellular network capabilities.

FIG. 7 illustrates an embodiment of a method for client-side management for reserving cellular network capabilities. Method 700 may be performed using a system, such as detailed in relation to FIGS. 1 and 2 (but likely having variations in its hierarchy) and a CNMS, such as detailed in relation to FIGS. 3 and 4. Method 700 may further be at least partially performed by a client's system that is in communication with an external client interface of a CNMS. For instance, blocks of method 700 may be performed using client system 310. The CNMS may function as part of the cellular network system or may be in communication with the cellular network (e.g., the CNMS may function outside of the cellular network, but may receive data about the cellular network). Method 700 may be performed as part of method 500 or a similar method.

At block 710, a client system may be used to create a service request. The service request may be generated by the client system based on rules and policies previously created by the administrator of the client. Therefore, the service request may be created without any administrator intervention. For instance, when the client system determines that additional wireless capabilities are required, the service request may be created automatically based on the previously established rules and policies. The service request created at block 710 may be similar to the example service request of Table 1. As part of block 710, the service request may also be transmitted to the cellular network service provider for evaluation.

In response to the transmitted service request, a cellular network access conditions package may be received in response from the cellular network service provider at block 720. The cellular network access conditions package may be created using the CNMS in accordance with method 500. In response to the cellular network access conditions package, the requirements of the service request may be altered. For instance upon evaluation by the client system of the cellular network access conditions package, a determination may be made that one or more parameters of the cellular network access conditions package is unacceptable. For example, a requested change to a QoS parameter may be unacceptable to the client. As another example, the price indicated in the cellular network access conditions package may be too high. At block 730, the service request may be revised to change the time period during which QoS parameters are required to be realized, the specifics of the QoS parameters, the location at which the UE will connect with the cellular network, and/or the number of UE to receive service via the cellular network. Alternatively, the service request may be altered to conform to the conditions of the cellular network access conditions package received a block 720. For instance, while the initial service request called for a particular QoS parameter to be met, the functionality of the system of the client may be adjusted to accommodate a modified QoS parameter. (For example, on the client's side, the resolution of streaming video may be decreased to accommodate that the cellular service provider cannot realize the bandwidth requested in the original service request.)

At block 740, either the revised service request that is in accordance with the cellular network access conditions package may be selected or a revised service request may be submitted to the CNMS. If a revised service request is submitted to the CNMS, Method 700 may return to block 710. If the service request has been revised to match the cellular network access conditions package received at block 720, the cellular network access conditions package may be selected and method 700 may proceed to block 750. At block 750, acceptance of the cellular network access conditions package may be transmitted to the CNMS. At block 760, UE of the client may use the cellular network in accordance with the accepted cellular network access conditions package.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method comprising:
obtaining, by a cellular network management system, performance data from a plurality of cellular network components of a cellular network over time, wherein:
the plurality of cellular network components comprise: radio access network (RAN) components and cellular network data centers of the core cellular network;
analyzing, by the cellular network management system, the performance data from the plurality of cellular network components to create a cellular network model indicative of performance of discrete portions of the cellular network over time;
receiving, by the cellular network management system, a service request from an external entity distinct from an entity operating the cellular network and cellular network management system, wherein:
the service request defines a plurality of quality of service (QoS) parameters requested by the external entity;
analyzing, by the cellular network management system, the cellular network model to determine that the cellular network has sufficient available resources to satisfy the plurality of QoS parameters of the service request;
creating, by the cellular network management system, a cellular network access conditions package, wherein the cellular network access conditions package defines one or more conditions under which the external entity is eligible to utilize the cellular network;
transmitting, by the cellular network management system, the cellular network access conditions package to the external entity;
receiving, by the cellular network management system, acceptance of the cellular network access conditions package from the external entity;
configuring, by the cellular network management system, at least some of the plurality of cellular network components to permit access to the cellular network by user equipment (UE) of the external entity in accordance with the cellular network access conditions package; and
providing, by the cellular network, data services to the UE of the external entity in accordance with the cellular network access conditions package.

2. The method of claim 1, wherein the plurality of QoS parameters comprises an indication of a location where the QoS parameters are to be met.

3. The method of claim 2, wherein the performance data obtained from the plurality of cellular network components of the cellular network comprises radio congestion data for the location where the QoS parameters are to be met.

4. The method of claim 1, wherein the cellular network access conditions package comprises matching QoS parameters that exactly match the QoS parameters of the service request.

5. The method of claim 1, wherein the QoS parameters of the service request comprise a time period defining when the QoS parameters are requested to be realized.

6. The method of claim 5, wherein the cellular network access conditions package comprises a first set of modified QoS parameters that differ from the QoS parameters of the service request.

7. The method of claim 6, wherein the cellular network access conditions package further comprises a second set of QoS parameters that match the QoS parameters of the service request.

8. The method of claim 7, wherein the cellular network access conditions package further comprises a first price mapped to the first set of modified QoS parameters and a second price mapped to the second set of QoS parameters.

9. The method of claim 1, wherein the cellular network access conditions package is indicative of a price.

10. A cellular network management system comprising:
a communication interface that communicates with a plurality of cellular network components of a cellular network;
one or more processors in communication with the communication interface; and
a memory storing instructions that, when executed by the one or more processors, configure the one or more processors to:
obtain performance data from the plurality of cellular network components of the cellular network over time via the communication interface;
analyze the performance data from the plurality of cellular network components to create a cellular network model indicative of performance of discrete portions of the cellular network over time;
receive a service request from an external entity distinct from an entity operating the cellular network and cellular network management system, wherein:
the service request defines a plurality of quality of service (QoS) parameters requested by the external entity;
analyze the cellular network model to determine that the cellular network has sufficient available resources to satisfy the plurality of QoS parameters of the service request;
create a cellular network access conditions package, wherein the cellular network access conditions package defines one or more conditions under which the external entity is eligible to utilize the cellular network;
transmit the cellular network access conditions package to the external entity;
receive acceptance of the cellular network access conditions package from the external entity; and
configure at least some of the plurality of cellular network components to permit access to the cellular network by one or more pieces of user equipment (UE) of the external entity in accordance with the cellular network access conditions package.

11. The cellular network management system of claim 10, wherein the plurality of QoS parameters comprises an indication of a location where the QoS parameters are to be met.

12. The cellular network management system of claim 11, wherein the performance data obtained from the plurality of cellular network components of the cellular network comprises radio congestion data for the location where the QoS parameters are to be met.

13. The cellular network management system of claim 10, wherein the cellular network access conditions package comprises matching QoS parameters that exactly match the QoS parameters of the service request.

14. The cellular network management system of claim 10, wherein the QoS parameters of the service request comprise a time period defining when the QoS parameters are requested to be realized.

15. The cellular network management system of claim 14, wherein the cellular network access conditions package comprises a first set of modified QoS parameters that differ from the QoS parameters of the service request.

16. The cellular network management system of claim 15, wherein the cellular network access conditions package further comprises a second set of QoS parameters that match the QoS parameters of the service request.

17. The cellular network management system of claim 16, wherein the cellular network access conditions package further comprises a first price mapped to the first set of modified QoS parameters and a second price mapped to the second set of QoS parameters.

18. The cellular network management system of claim 10, wherein the cellular network access conditions package is indicative of a price.

19. A non-transitory computer-readable storage medium, the non-transitory computer-readable storage medium including instructions that when executed by a computer, cause the computer to:
  obtain performance data from a plurality of cellular network components of a cellular network over time, wherein:
    the plurality of cellular network components comprise: radio access network (RAN) components and cellular network data centers of the core cellular network;
  analyze the performance data from the plurality of cellular network components to create a cellular network model indicative of performance of discrete portions of the cellular network over time;
  receive a service request from an external entity distinct from an entity operating the cellular network and cellular network management system, wherein:
    the service request defines a plurality of quality of service (QoS) parameters requested by the external entity;
  analyze the cellular network model to determine that the cellular network has sufficient available resources to satisfy the plurality of QoS parameters of the service request;
  create a cellular network access conditions package, wherein the cellular network access conditions package defines one or more conditions under which the external entity is eligible to utilize the cellular network;
  transmit the cellular network access conditions package to the external entity;
  receive acceptance of the cellular network access conditions package from the external entity; and
  configure at least some of the plurality of cellular network components to permit access to the cellular network by one or more pieces of user equipment (UE) of the external entity in accordance with the cellular network access conditions package.

20. The non-transitory computer-readable storage medium of claim 19, wherein:
  the plurality of QoS parameters comprises an indication of a location where the QoS parameters are to be met; and
  the performance data obtained from the plurality of cellular network components of the cellular network comprises radio congestion data for the location where the QoS parameters are to be met.

* * * * *